United States Patent [19]

Takano et al.

[11] Patent Number: 5,794,869
[45] Date of Patent: Aug. 18, 1998

[54] PAPER WINDING DEVICE FOR PHOTOGRAPHIC PRINTER

[75] Inventors: Shigeyuki Takano; Akira Okuma; Yasuhito Suzuki, all of Saitama, Japan

[73] Assignees: Fuji Photo Film Co., Ltd., Kanagawa; Fuji Photo Optical Co., Ltd., Saitama, both of Japan

[21] Appl. No.: 889,087

[22] Filed: Jul. 7, 1997

Related U.S. Application Data

[63] Continuation of Ser. No. 658,016, Jun. 4, 1996, abandoned, which is a continuation of Ser. No. 265,216, Jun. 24, 1994, abandoned.

[30] Foreign Application Priority Data

Jun. 25, 1993 [JP] Japan ............................ 5-155500

[51] Int. Cl.$^6$ .......................... G11B 15/56; G03B 1/58; G03B 21/43
[52] U.S. Cl. .......................... 242/331.5; 242/332.7; 242/333; 242/413.2; 242/357
[58] Field of Search .......................... 242/331.5, 334.5, 242/332, 331.4, 333, 412, 413.3, 534.2, 543, 332.7, 413.2, 357

[56] References Cited

U.S. PATENT DOCUMENTS

| | | | |
|---|---|---|---|
| 3,310,250 | 3/1967 | Michiels et al. | 242/331.5 |
| 3,341,141 | 9/1967 | Jura et al. | 242/331.5 |
| 3,785,588 | 1/1974 | Schramm | 242/331.5 |
| 3,908,923 | 9/1975 | Salgo | 242/534.2 X |
| 3,982,710 | 9/1976 | Teumer | 242/413.2 X |
| 4,225,098 | 9/1980 | Henkler et al. | 242/334.5 |
| 4,663,573 | 5/1987 | Maetani et al. | 242/333 X |

FOREIGN PATENT DOCUMENTS 1186510  4/1970  United Kingdom ................ 242/331.5

*Primary Examiner*—John Q. Nguyen
*Attorney, Agent, or Firm*—Sughrue, Mion, Zinn, Macpeak & Seas, PLLC

[57] ABSTRACT

A paper winding device for winding up photographic paper after exposure on a take-up spool in a photographic printer. A loop forming portion for storing exposed portion of the photographic paper in the form of a loop is disposed before the take-up spool. The take-up spool is rotated by a DC motor which is activated or inactivated depending on the amount of the loop. A paper guide arm is provided to confine the outermost convolution of the paper roll wound on the take-up spool. An angle detector detects the inclination of the paper guide arm to determine the paper roll diameter. The DC motor is dynamically braked after inactivated, and resistance value or braking time for dynamic braking of the DC motor is changed in accordance with the paper roll diameter, to reduce variation in paper winding amount with paper roll diameter in the delay time from the inactivation to the actual stop of the DC motor.

7 Claims, 10 Drawing Sheets

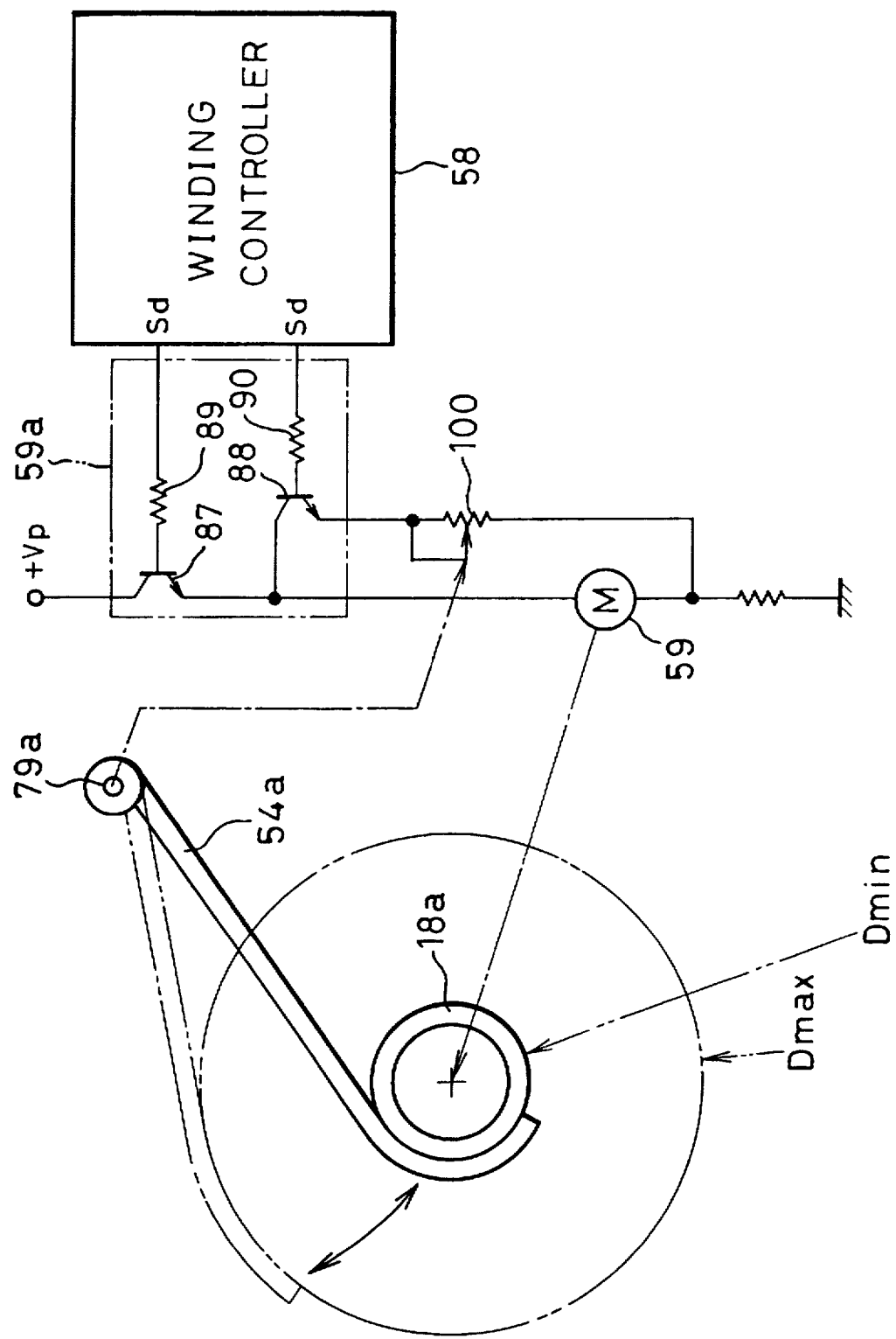

PAPER WINDING DEVICE FOR PHOTOGRAPHIC PRINTER

This is a Continuation of application Ser. No. 08/658,016 filed Jun. 4, 1996, abandoned, which is a Continuation of application Ser. No. 08/265,216 filed Jun. 24, 1994, now abandoned.

BACKGROUND OF THE INVENTION

1. Field of the Invention

The present invention relates to a paper winding device for use in an automatic photographic printer. Particularly, the present invention relates to a paper winding device for winding up photographic paper after exposure on a take-up spool in a photographic printer by rotating the take-up spool by a DC motor which is dynamically braked after inactivated.

2. Related Art

In a large scale photo-lab, a large number of exposed photographic filmstrips are spliced into a long strip and wound in a roll, to achieve an efficient printing. The film roll is set in a film processor for development, and thereafter is inspected by a notcher-puncher which is an inspector having a notcher for marking the center of each picture frame with a notch and a puncher for recording inspection data in a punched card or tape. According to the results of inspection, an automatic printer makes photo-prints in rapid succession, such that the long strip of developed photographic film is withdrawn from the roll to position the picture frames seriatim in a print station, and the picture frames are seriatim printed onto photographic paper. Also the photographic paper is withdrawn from a roll, and is positioned in an exposure station synchronously with the photographic film. The exposed or image printed portion of the photographic paper is rewound in a roll, and the roll of exposed paper is subjected to photographic processing in a paper processor.

In conventional automatic printers, feed rollers are used for transporting the photographic paper from a paper supply spool toward a paper take-up spool, and a dancer arm winding system using at least a dancer roller, which is movably supported by a dancer arm, is provided for transporting the photographic paper along a zigzag path, tensing the paper appropriately. As the angle of the dancer arm changes with the length of a loop of a portion of the photographic paper around the dancer roller, a winding motor for driving the take-up spool is activated or stopped depending on the change of the angle of the dancer arm. The dancer arm winding system requires a simple mechanism and absorbs inertia of the take-up spool by changing the angle of the dancer arm, that is, by changing the length of the loop around the dancer roller. Thereby, undesired fluttering of the photographic paper and impact on the mechanism are reduced. However, a leader of the photographic paper could not be automatically loaded around the dancer roller without a very complicated paper loading mechanism. Therefore, the dancer arm winding system has not been applied to a photographic printer with an automatic paper loading system.

Many photographic printers having an automatic paper loading system, therefore, adopt a free loop winding system, wherein a free loop forming portion is provided between paper feed rollers and a paper take-up spool. Because the free loop winding system does not give backward tension to the photographic paper, the photographic paper would not be highly and neatly wound on the take-up spool unless an additional tensing device is provided. Moreover, as the diameter of the paper roll wound on the take-up spool increases, the time lag from the inactivation of a winding motor to the actual stop of the take-up spool increases due to inertia, so that it may sometime happen that the free loop is completely eliminated, and thus the photographic paper is placed under tension between the take-up spool and the paper feed roller.

To solve the above problems in the free loop winding system, a conventional free loop winding system has a lead-in roller disposed between the exit of the last free loop forming portion and the paper take-up spool. The lead-in roller is driven by a motor or the like in synchronism with the start and stop of the take-up spool. In more detail, the lead-in roller is controlled to stop or start rotating with a predetermined delay time from the start or stop of the take-up spool, so as to brake or tension the photographic paper between the lead-in roller and the take-up spool. Thereby, the photographic paper is tightly and neatly wound on the take-up spool. However, because of this construction, the effect of inertia on the winding, which increases with the increase of the diameter of the paper roll wound on the take-up spool, is so large that the conventional paper winding device is quite noisy, and that drive mechanisms tend to be broken due to vibration and impact applied thereto. For example, stay bolts for securing the winding motor or a transmission shaft of the motor is bent, or transmission gears are defaced.

SUMMARY OF THE INVENTION

In view of the foregoing, the present invention has an object to provide a paper wind-up device, wherein paper winding amount in a delay time from inactivation of a winding motor to the actual stop thereof is maintained approximately constant independently of the diameter of the paper roll, and thus vibration and impact are sufficiently reduced to restrain the occurrence of mechanical defects.

To achieve the above object, a paper winding device according to the invention provides a detector for detecting a diameter of a paper roll wound on a take-up spool which is rotated by a DC motor, a dynamic brake portion for braking the DC motor by connecting a braking resistance to the DC motor, and an adjusting portion connected between the detector and the dynamic brake portion for adjusting braking force of the dynamic brake portion in accordance with the paper roll diameter, so as to reduce variation in paper winding amount with the paper roll diameter within a time from inactivation of the DC motor to actual stop thereof.

In this way, the undesirable effect of inertia is reduced. Therefore, the paper winding amount from the inactivation of the winding motor to the actual stop thereof is maintained approximately constant, so that vibration and impact are sufficiently reduced to restrain the occurrence of mechanical defects.

According to a preferred embodiment of the invention, the detector is comprised of a pivotal arm whose distal end is urged to contact the outermost convolution of the paper roll, and an angle detector for detecting declination of the pivotal arm which represents the paper roll diameter. The dynamic brake portion may have a plurality of different resistances, so that the adjusting portion may select one of the resistances as the braking resistance in accordance with the paper roll diameter. The dynamic brake portion may have a single braking resistance, while the adjusting portion changes the connection time of the braking resistance to the DC motor. The dynamic brake portion may have a rheostat whose value is adjustable by the adjusting portion.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein:

FIG. 11 is a circuit diagram illustrating essential parts of a paper winding device according to a third embodiment.

DETAILED DESCRIPTION OF THE PREFERRED EMBODIMENT

Figure 1:
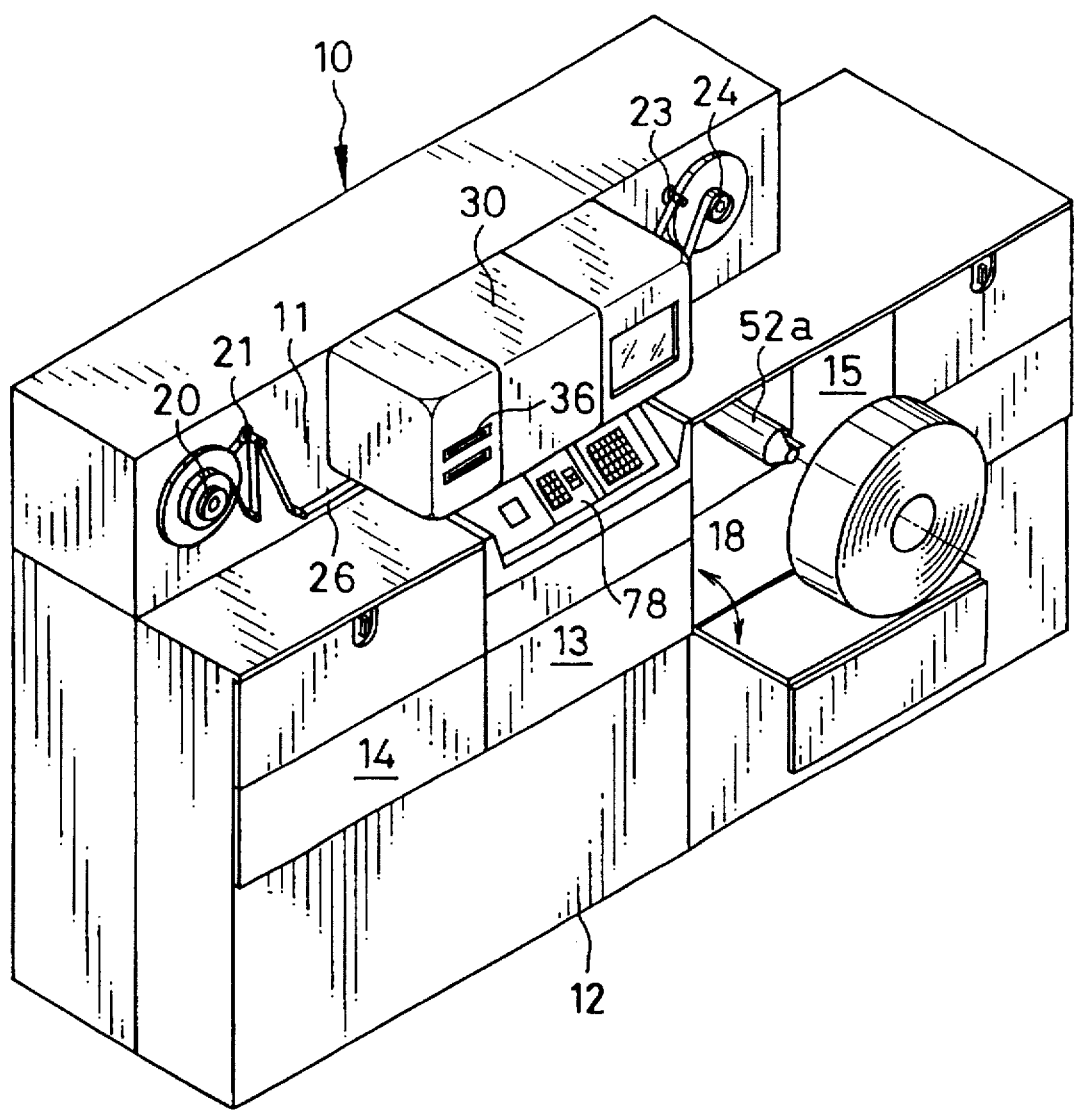
FIG. 1 is a perspective view of an automatic photographic printer having a paper winding device according to a preferred embodiment of the invention.
Figure 2:
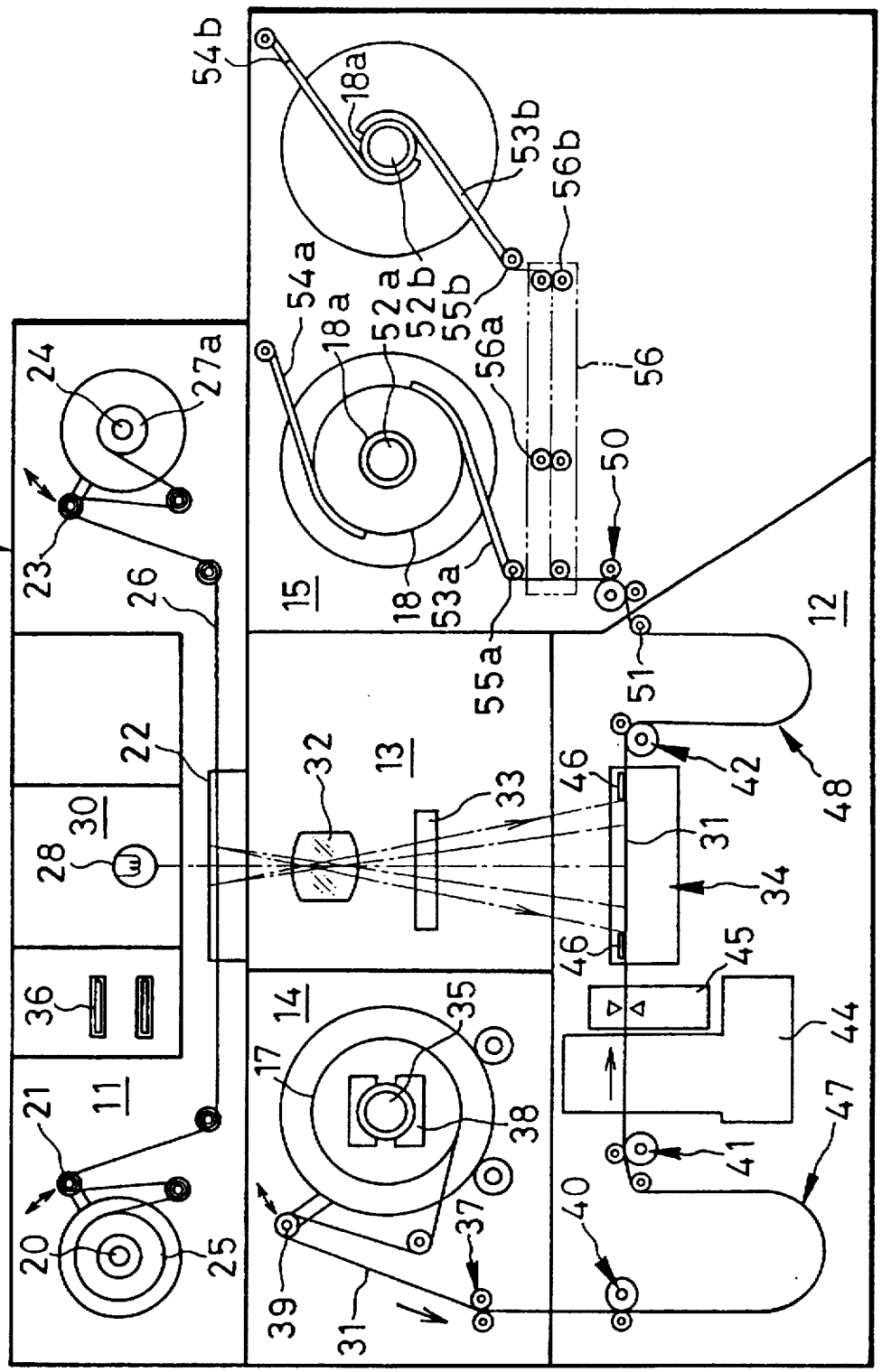
FIG. 2 is a schematic view of the overall construction of the photographic printer shown in FIG. 1.

FIGS. 1 and 2 show an automatic printer having a paper winding device. In a printer housing 10, a film transporting section 11 is disposed horizontally in an upper portion, and a paper transporting section 12 is disposed horizontally in a lower portion. A print section 13 is disposed vertically between the film transporting section 11 and the paper transporting section 12. A paper supply section 14 is disposed on one horizontal side of the print section 13, and a paper take-up section 15 is disposed on the opposite side of the print section 13 from the paper supply section 14. A roll of unexposed color photographic paper 17 is loaded in the paper supply section 14, and exposed portion of the color photographic paper is rewound into a roll 18 in the paper take-up section 15.

The film transporting section 11 is provided with a film supply spindle 20, a supply dancer roller 21, a film carrier 22, a take-up dancer roller 23, and a film take-up spindle 24. A filmstrip 26 drawn from a film supply reel 25 is set in the film carrier. The film carrier 22 positions picture frames of the filmstrip 26 to be printed seriatim in a print position with reference to a notch formed in association with each picture frame to be printed. Thereafter, the filmstrip 26 is rewound around a film take-up reel 27.

The print section 13 is provided with a light source unit 30 having a lamp 28 and not-shown cut filter and diffusion box. The light source unit 30 illuminates the picture frame positioned in the film carrier 22. While a shutter 33 opens, the light passing through the picture frame is focused by a zoom lens 32 onto photographic color paper 31 which is drawn from the paper roll 17 and is positioned in an exposure station 34. The paper supply section 14 is provided with a paper supply spindle 35 for supporting the paper roll 17 and a pair of paper feed rollers 37 for feeding the color photographic paper 31 to the paper transporting section 12. The paper supply spindle 35 is provided with a brake mechanism 38 which cooperates with a dancer roller 39 so as to prevent loosening of the paper roll 17 while smoothly feeding out the color photographic paper 31. Designated by 36 is a data read-write unit for reading film inspection data from a memory card or writing print data on a memory card.

The paper transporting section 12 includes three pairs of feed rollers 40, 41 and 42 which transport the paper 31 toward the paper take-up section 15 through a splicer 44, a cutter 45 and the exposure station 34 having a variable paper mask 46. A first loop forming portion 47 is provided before the splicer 44, for absorbing difference between the speed of continuous paper feeding from the paper supply section 14 and the speed of periodic printing-and-advancing in the exposure station 34. The first loop forming portion 47 is also utilized for gaining time for paper splicing or cutting. A second loop forming portion 48 and a paper guide roller 51 for guiding the color photographic paper 31 to a lead-in roller system 50 are disposed before the paper take-up section 15. The second loop forming portion 48 is provided for absorbing the difference between the printing and advancing speed and the paper winding speed. The paper guide roller 51 is provided with a pair of paper guides (not-shown) which are movable relative to each other in opposite directions along an axis of the guide roller 51, so as to be adjusted to the width of the color photographic paper 31.

Figure 3:
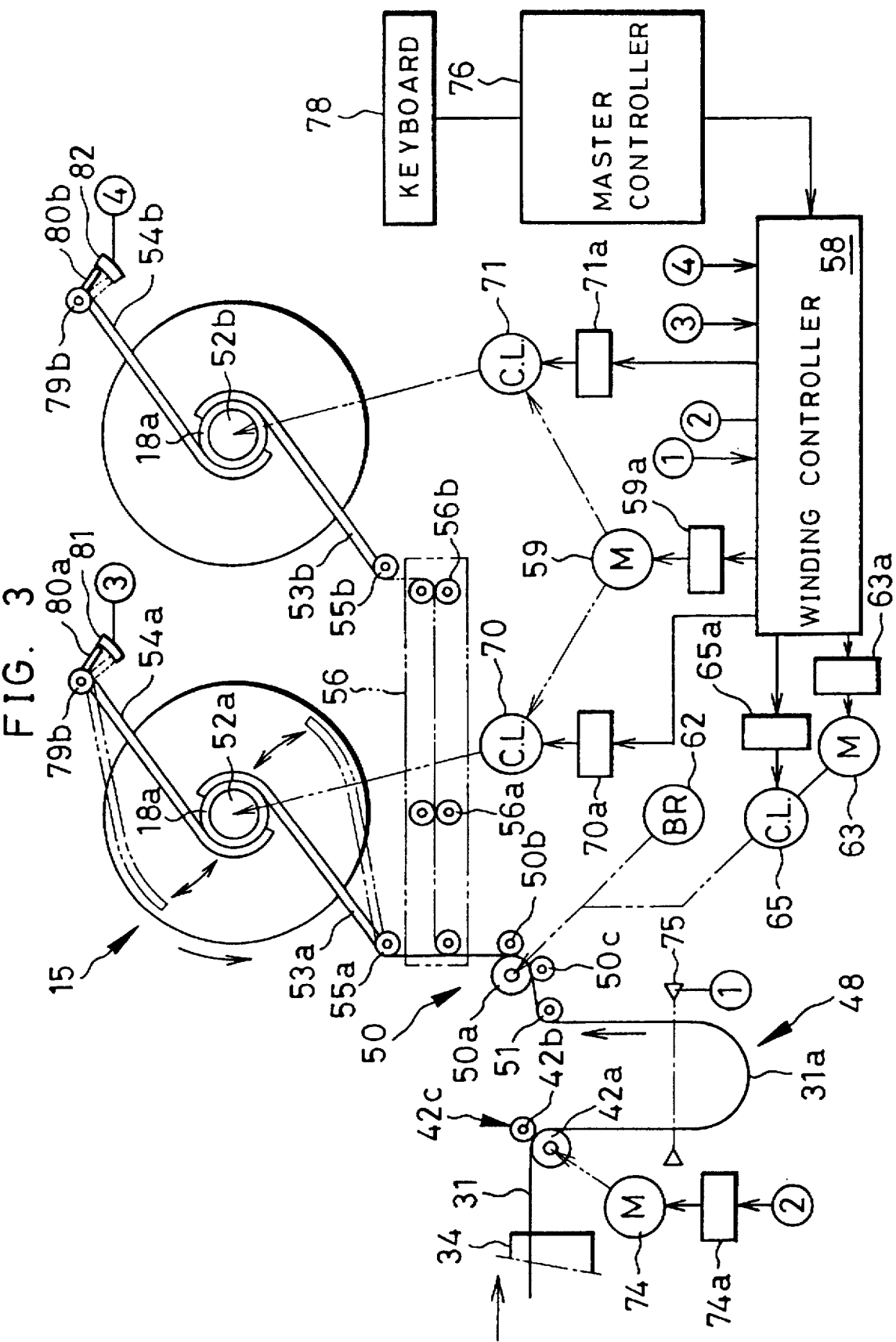
FIG. 3 is a block diagram showing the paper winding device of the preferred embodiment.

As shown in FIG. 3, a paper winding device disposed in the paper take-up section 15 is constituted of the lead-in roller system 50, first and second winding portions, each having a spindle 52a, 52b, a pair of lower and upper paper guide arms 53a and 54a; 53b and 54b, and a guide roller 55a, 55b. The paper winding device also has a change-over mechanism 56 for guiding a leading end of the color photographic paper 31 to either of the first and second winding portions. When the exposed portion of the color photographic paper 31 has been fully wound on a take-up spool 18a which is fitted on one of the first and second spindle, the take-up spool 18a with the paper roll 18 is removed from the spindle 52a or 52b while the following exposed portion of the color photographic paper 31 is wound on another take-up spool 18a which is fitted on the other spindle 52b or 52a. Therefore, it is unnecessary to stop the printer when removing the paper roll 18.

The paper take-up spindles 52a and 52b are alternatively coupled to a DC winding motor 59 through clutches 70 and 71, so as to be alternatively rotated by the DC winding motor 59. The clutch 70 and 71 and the DC winding motor 59 are connected to a winding controller 58 respectively through drivers 70a, 71a and 59a. The winding controller 58 detects current through the DC winding motor 59 to check if the leading end of the color photographic paper 31 has been wound around the take-up spool 18a. Completion of the winding of the paper leading end can be determined with reference to the motor current, because the load on the DC winding motor 58 increases upon completion of the winding of the paper leading end, so that the current rises above a predetermined value at that time.

Figure 4:
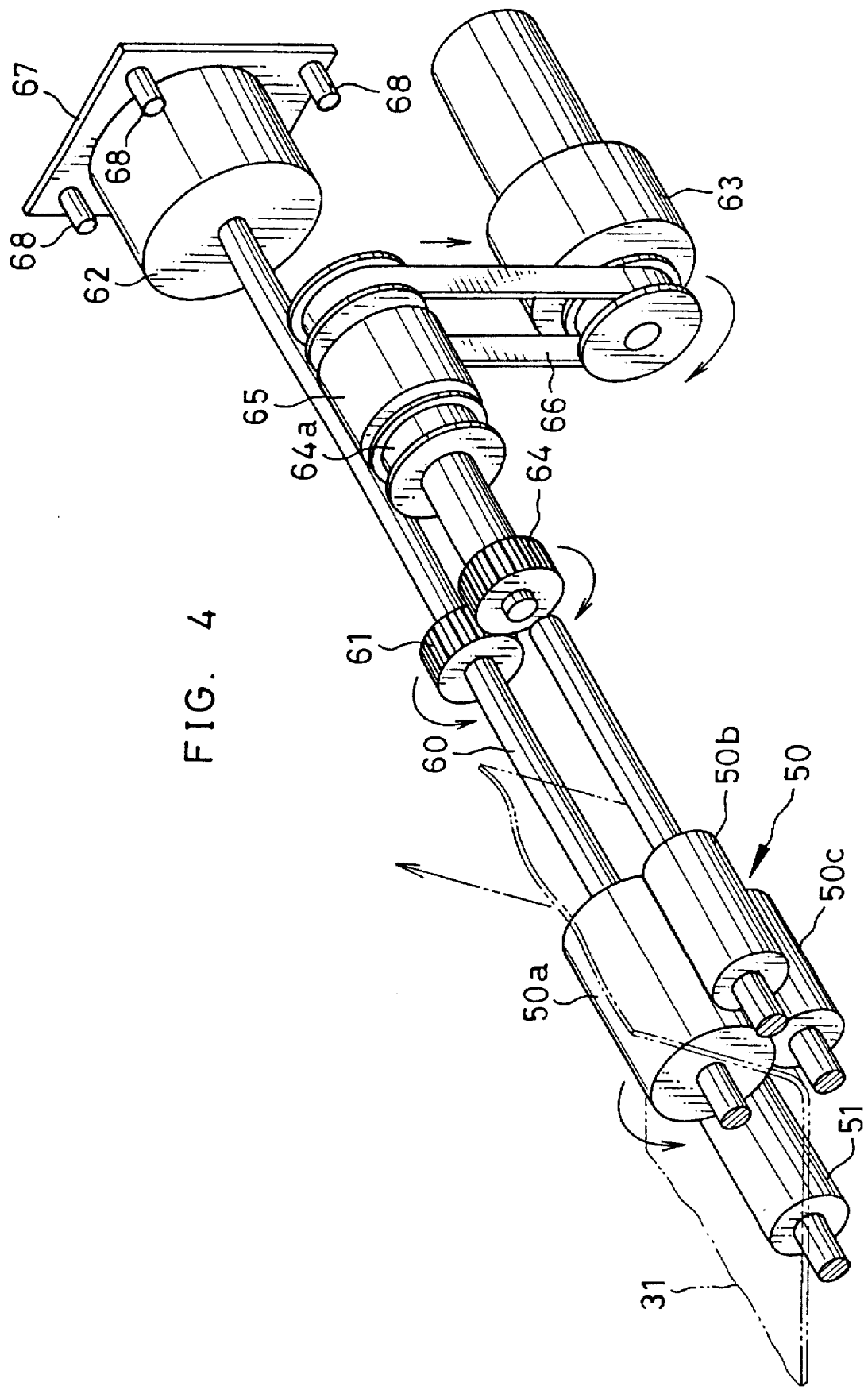
FIG. 4 is a perspective view of a drive mechanism of the paper winding device, for driving a paper lead-in roller.

As shown in FIGS. 3 and 4, the lead-in roller system 50 is constituted of a drive roller 50a, a nip roller 50b and a guide roller 50c. The color photographic paper 31 is nipped between the drive roller 50a and the nip roller 50b to be transported toward the change-over mechanism 56. The guide roller 50c turns the transporting direction from horizontal to obliquely upward. Therefore, there is an air gap of about 1 mm between the drive roller 50a and the guide roller 50c.

As shown in FIG. 4, the drive roller 50a is mounted on a shaft 60 on which a driven gear 61 is mounted, and to which a brake mechanism 62 is coupled. The driven gear 61 meshes with a drive gear 64 which is coupled to a lead-in motor 63 through a clutch 65 and a timing belt 66. As shown in FIG. 3, the clutch 65 is connected to the winding controller 58 through a driver 65a to be controlled on and off. As shown in FIG. 4, the drive gear 64 is provided integrally with a timing pulley 64a, on which a timing belt (not-shown) is suspended to transmit the rotation of the lead-in motor 63 to the change-over mechanism 56. The brake mechanism 62 is secured to a mechanism frame (not shown) through a bracket 67 and stay bolts 68. The brake mechanism 62 is adapted to load a constant resistance onto the shaft 60 of the drive roller 50a while the drive roller 50a is rotated by the movement of the photographic paper 31 during the paper winding.

According to a preferred embodiment, the brake mechanism 62 is constituted of a magnet disc having a plurality of magnetic poles and a steel hysteresis disc opposed near to the magnet disc at a variable spacing. While the magnet disc rotates relative to the hysteresis disc, respective segments of the hysteresis disc which are opposed to the poles of the magnet disc, are alternately magnetized to generate an amount of hysteresis loss. The hysteresis loss generates a force which resists against the relative rotation of the discs, and thus brakes the lead-in roller system 50. The braking power becomes the larger, the smaller the spacing between the hysteresis disc and the magnet disc.

The brake mechanism 62 may be a conventional hysteresis brake, wherein electromagnetic coils are used instead of the above-described magnet disc. The conventional hysteresis brake can continuously generate a constant amount of torque by controlling exciting current. The hysteresis brake can be electrically controlled on and off so as to selectively transmit the braking force. Therefore, it is possible to reduce resistance against the paper advancing during the automatic paper loading.

In the second loop forming portion 48, a free loop 31a is formed between the paper feed roller pair 42 and the lead-in roller system 50 by rotating the rollers individually in groups. The paper feed roller pair 42 is constituted of a drive roller 42a and a nip roller 42b, and the drive roller 42a is rotated by a paper feed motor 74. The paper feed motor 74 is a pulse motor which is controlled by the winding controller 58 through a driver 74a. A loop sensor 75 is disposed in the second loop forming portion 48, for outputting a loop detection signal to the winding controller 58. The winding controller 58 is connected to a master controller 76 so as to receive various control signals therefrom. Based on the loop detection signal as well as the control signals, the winding controller 58 sequentially controls the lead-in motor 63, the DC winding motor 59, the respective clutches 65, 70 and 71.

The paper guide arms 53a and 54a; 53b and 54b are urged by not-shown coiled springs to move in a direction to contact at their distal ends on the periphery of the take-up spool 18a or the outermost convolution of the paper roll 18. The distal ends of the paper guide arms 53a, 54a, 53b and 54b are made to have a resiliency so as to be resiliently deformed in correspondence with the outline of the outermost convolution of the paper roll 18. The distal ends are preferably provided with a plurality of press rollers each which tightly contact the outermost convolution of the paper roll 18. The lower paper guide arms 53a and 53b serve as guide members for guiding the leading end of the paper 31 toward the take-up spool 18a.

Figure 5:
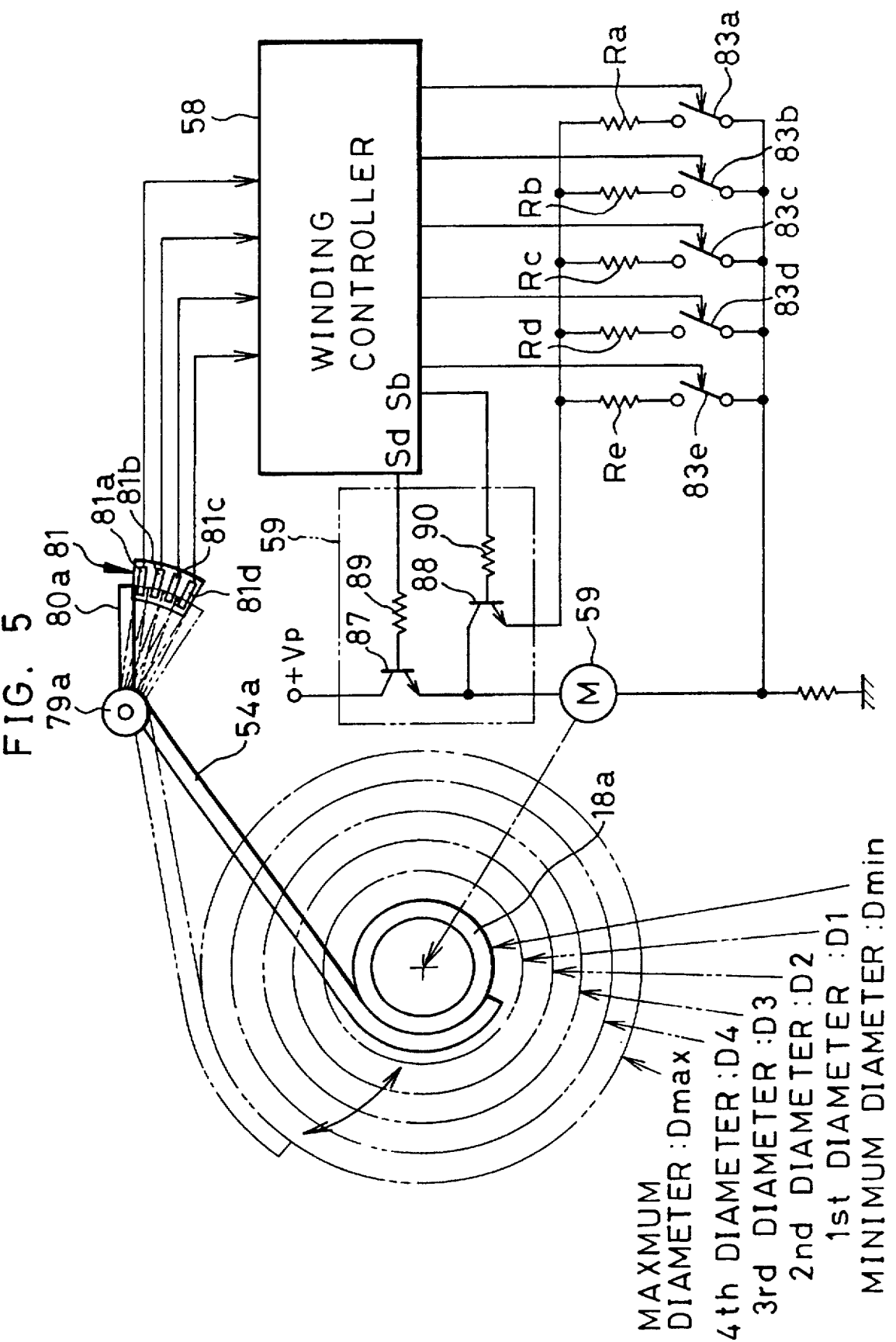
FIG. 5 is a circuit diagram illustrating essential parts of the paper winding device shown in FIG. 3.

As shown in FIGS. 3 and 5, the upper paper guide arms 54a and 54b are provided with angle detection plates 80a and 80b secured to shafts 79a and 79b of the respective arms 54a and 54b. To determine the declination of the angle detection plates 80a and 80b, angle detectors 71 and 72 are disposed in association with the angle detection plates 80a and 80b in a peripheral range of each shaft 79a, 79b. The angle detector 81 has four sensors 81a, 81b, 81c and 81d, e.g., reflective optical sensors or contact sensors, which detect the declination of the detection plate 80a and thus the paper guide arm 54a, that corresponds to the diameter of the paper roll 18, in five steps. Although merely the angle detector 81 is shown in FIG. 5, the angle detector 82 is also constituted of four sensors 82a to 82d in the same manner as the angle detector 81. The angle detectors 81 and 82 are fixedly mounted such that the four sensors 81a to 81d, 82a to 82d are located at regular intervals that correspond to four angular positions of each arm 54a, 54b for detecting four diameters D1 to D4, respectively. With reference to the four diameters D1 to D4, the paper roll diameter is determined in increments of 20% of a paper roll diameter range from a minimum diameter Dmin to a maximum diameter Dmax.

The winding controller 58 determines the diameter of the paper roll 18 based on the arm angle detection signals from the angle detectors 81 and 82. Depending on the paper roll diameter, the winding controller 58 selects, through selector switches 73a to 73e, an optimum one of a plurality of resistances Ra to Re for dynamic braking of the DC winding motor 59. In correspondence with the five angle detection ranges of the angle detector 81 and 82, there are provided five different resistances Ra, Rb, Rc, Rd and Re, wherein Ra>Rb>Rc>Rd>Re. The smaller is the selected resistance, the larger the power of brake becomes.

Figure 6:
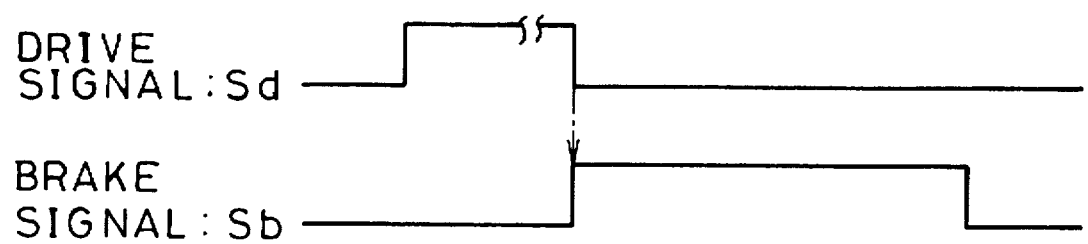
FIG. 6 is timing charts of signals used for the paper winding device shown in FIG. 3.
Figure 7:
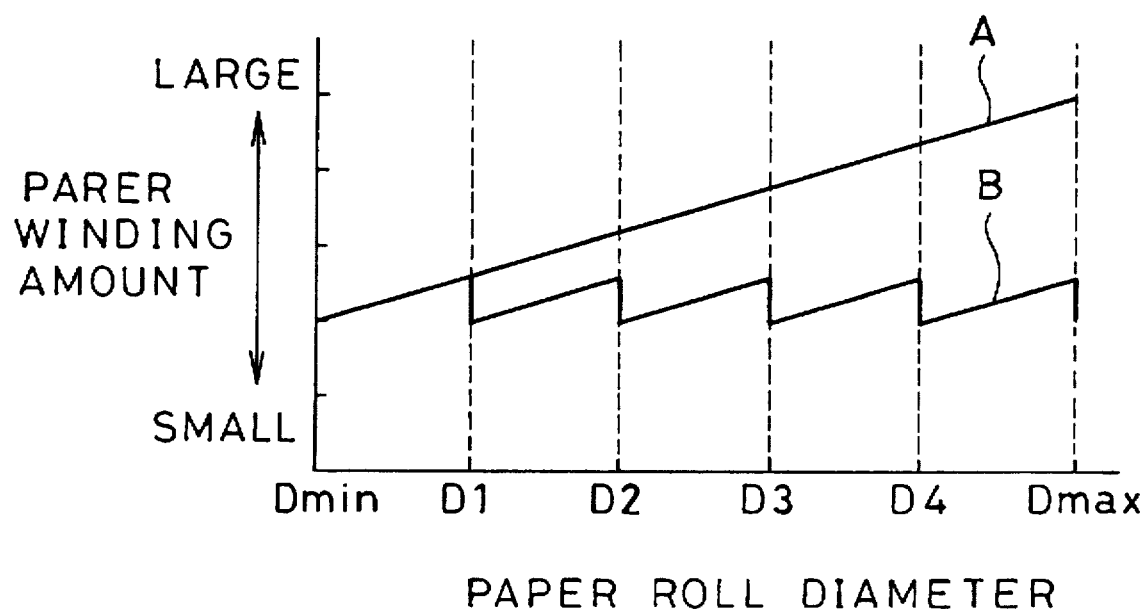
FIG. 7 is a graph illustrating the variation in paper winding amount from the inactivation to the actual stop of the winding motor, with respect to the paper roll diameter.

The driver 59a of the DC winding motor 59 has switching transistors 87 and 88, and resistances 89 and 90. When the switching transistor 87 is turned on in response to a motor drive signal Sd, as is shown in FIG. 6, a drive voltage Vp is applied to the DC winding motor 59. To stop the DC winding motor 59, the switching transistor 88 is turned on in response to a brake signal Sb. Because one of the resistances Ra to Re is connected to the switching transistor 88 in accordance with the arm angle detection signal from the angle detector 81 or 82, the DC winding motor 59 is braked by a force variable in accordance with the paper roll diameter. In this way, the amount of paper wound up in a delay time from the inactivation to the actual stop of the DC winding motor 59 is maintained approximately constant, as is shown in FIG. 7.

In a case where a constant resistance is utilized for dynamic braking, the amount of paper wound in the delay time from the inactivation of the DC winding motor 59 to the actual stop thereof increases with the increase of the diameter of the paper roll 18, as is shown by a curve A. On the contrary, as is shown by a curve B, because the present embodiment divides the paper diameter changing range into five grades by using the four sensors 81a to 81d, and selects, in accordance with the diameter grade, one of the five different resistances Ra to Re for the dynamic braking of the DC winding motor 59, variation in paper winding amount in the delay time from the inactivation to the actual stop of the DC winding motor 59 is reduced to about one-fifth of the variation in the former case shown by the curve A. Thereby, impact at the stop of the paper winding is reduced, and hence noise and mechanical defect are restrained to the minimum.

Figure 8:
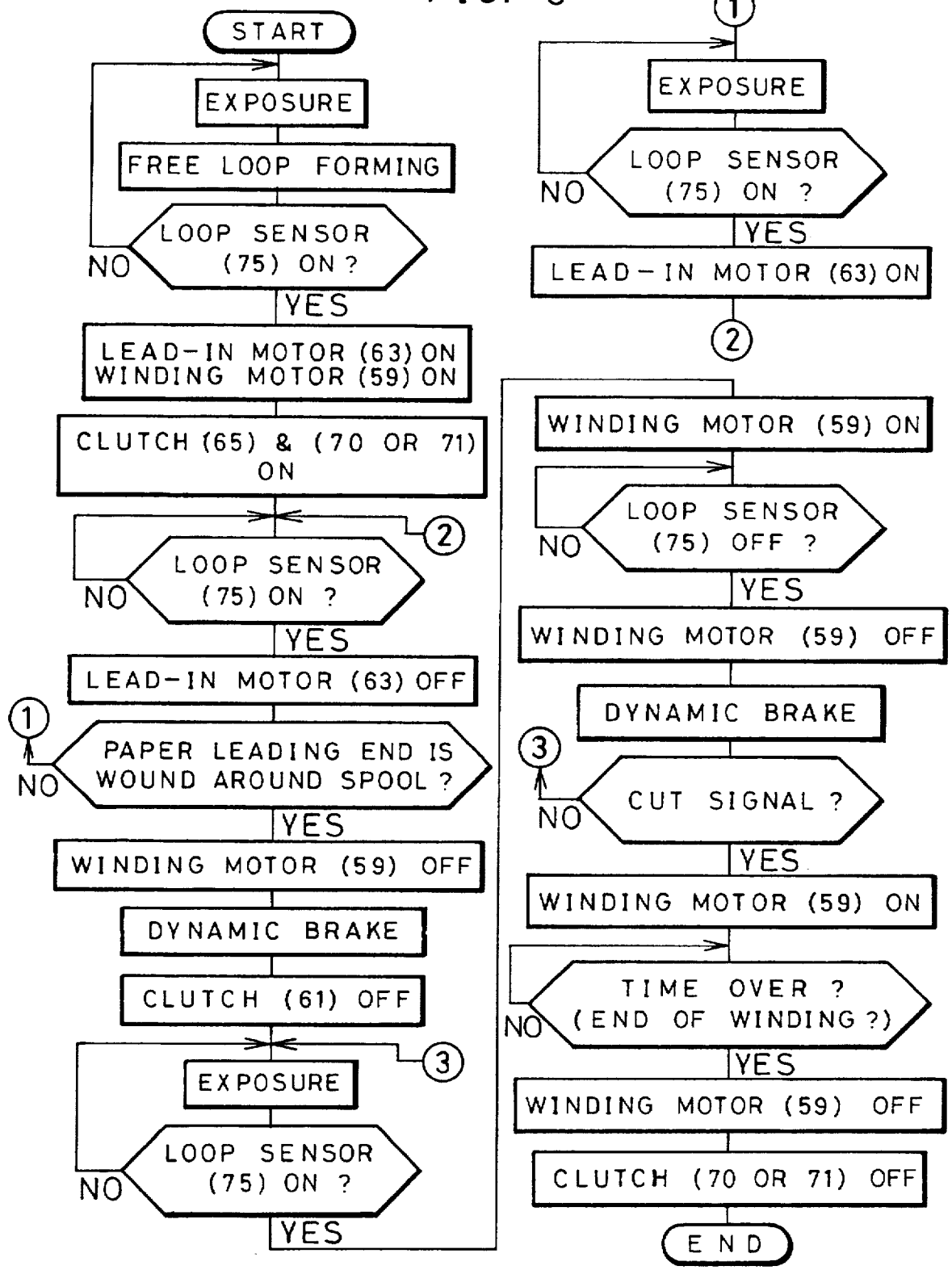
FIG. 8 is a flow chart illustrating a sequence of operation of the paper winding device.

Now, the operation of the embodiment as set forth above will be described with reference to FIGS. 8 and 9. First, one of the picture frames to be printed is positioned in the film carrier 22, and the picture is printed onto a portion of the color photographic paper 31 positioned in the exposure station 34. Thereafter, the color photographic paper 31 is advanced to replace the exposed portion by an unexposed portion in the exposure station 34. Until the leading end of the color photographic paper 31 reaches the lead-in roller system 50, the leading end is guided on a not-shown guide plate from the feed roller pair 42 toward the guide roller 51. Upon the leading end reaching the lead-in roller system 50, the lead-in motor 63, which is coupled to the drive roller 50a through the clutch 65, starts rotating to cause the lead-in roller system 50 to nip and transport the color photographic paper 31. Thereafter, the guide plate is retracted from the second loop forming portion 48 so as to permit forming the free loop 31a.

When the free loop 31a exceeds a predetermined amount in the course of printing, the loop sensor 75 is turned on to output the loop detection signal. In response to the loop detection signal, the winding controller 58 activates the motors 59 and 63 and, concurrently herewith, turns the clutch 70 or 71 on. Thereby, the drive roller 50a is rotated to lead the color photographic paper 31 toward the first or the second paper take-up spindle 52a or 52b through the guide roller 55a or 52b and the guide arms 53a and 54a; or 53b and 54b. Each time the amount of the free loop 31a is so decreased that the loop sensor 75 cannot detect the free loop 31a, the rotation of the drive roller 50a pauses. Simultaneously, the winding controller 58 detects the change of load applied on the DC winding motor 59 with reference to the change of current through the DC winding motor 59, so as to determine the completion of initial winding of the paper leading end around the take-up spool 18a in response to a predetermined increment of the current.

When the leading end of the color photographic paper 31 has been wound around the take-up spool 18a, the winding motor 59 is dynamically braked by being connected to the first resistance Ra. Simultaneously, the clutch 65 is decoupled to disconnect the lead-in motor 63 from the lead-in roller system 50. Thereafter, when the amount of the free loop 31a in the second loop forming portion 48 increases with the proceeding of printing and reaches the predetermined amount that turns the loop sensor 75 on, the DC winding motor 59 starts rotating again to wind up the color photographic paper 31. Because the brake mechanism 62 loads the drive roller 50a with torque of about 2 Kgcm, the drive roller 50a applies a resistance or tightening force onto the color photographic paper 31 during the paper winding. Therefore, the color photographic paper 31 is wound into a neat and tight roll on the take-up spool 18a by rotating the paper take-up spindle 52a or 52b by the DC winding motor 59.

Figure 9:
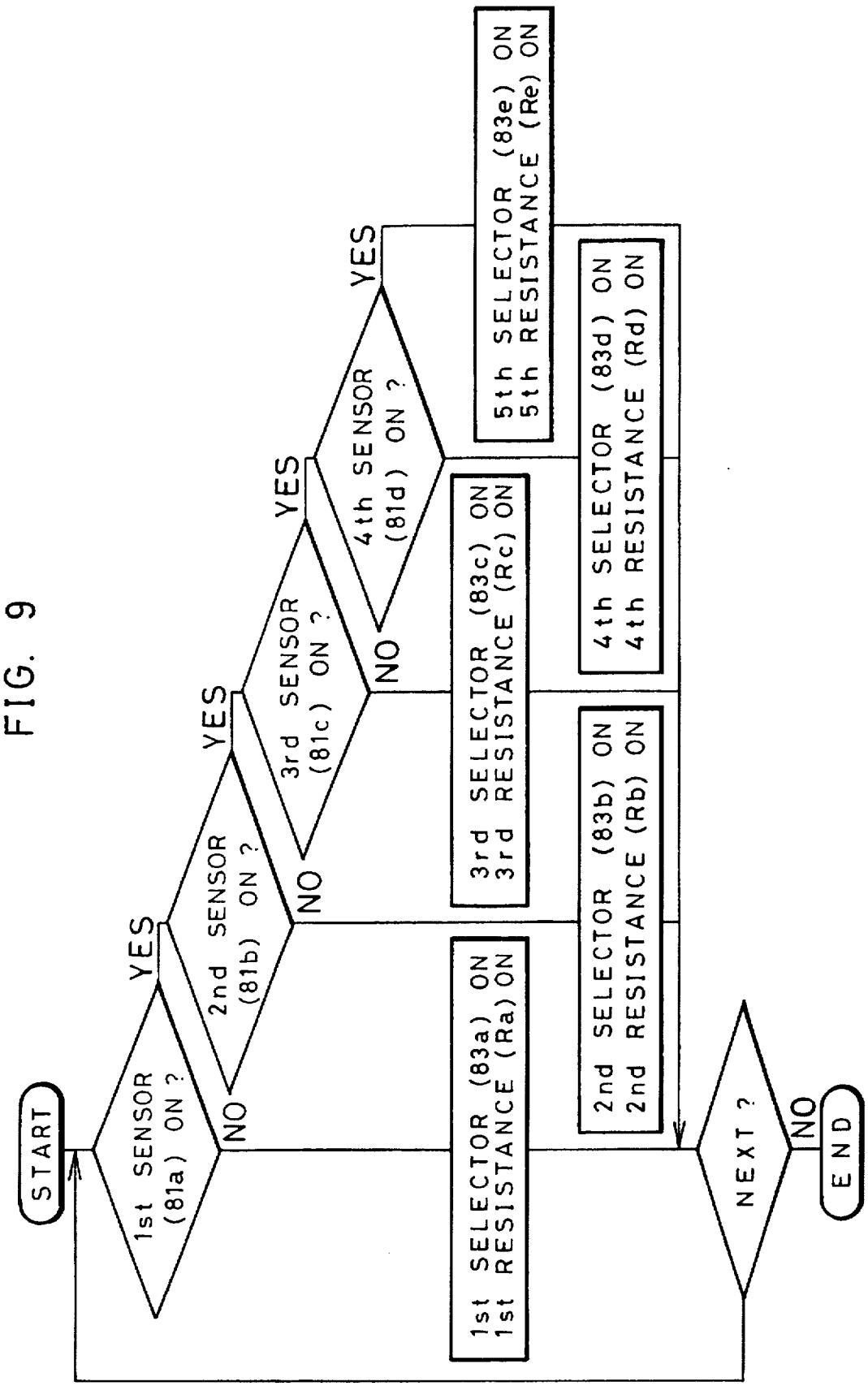
FIG. 9 is a flow chart illustrating a sequence of resistance selection in accordance with the paper roll diameter.

Each time the free loop 31a in the second loop forming section 48 becomes less than the predetermined amount, the loop sensor 75 is turned off, and the winding controller 58 causes the DC winding motor 59 to stop by dynamic braking the DC winding motor 59 by using an optimum one of the resistances Ra to Re in accordance with the paper roll diameter, as is shown in FIG. 9. Specifically, as long as the first sensor 81a is turned off, the first resistance Ra is used for braking. When the first sensor 81a is turned on, the second resistance Rb is used for braking. When the second sensor 81b is turned on, the third resistance Rc is used for braking. When the third sensor 81c is turned on, the fourth resistance Rd is used for braking. When the fourth sensor 81d is turned on, the fifth resistance Re is used for braking. Because Ra>Rb>Rc>Rd>Re and the smaller resistance provides the larger braking force, the effects of inertia, that increases with the paper roll diameter, is compensated. In this way, the color photographic paper 31 is intermittently wound up around the take-up spool 18a with reference to the loop detection signal from the loop sensor 75.

To terminate the printing, a keyboard 78 is operated to cause the master controller 76 to output a cut signal to the cutter 45 and the winding controller 58. Then, the cutter 45 cuts the color photographic paper 31, and the DC winding motor 59 is turned on to wind up the color photographic paper 31. When the color photographic paper 31 is completely wound up to a trailing end thereof, the DC winding motor 59 is turned off. Remaining unexposed portion of the color photographic paper 31 may be automatically loaded in the same manner as described above for the next printing, or may be automatically wound back onto the paper roll 17 by reversely rotating the paper supply spindle 35.

Figure 10:
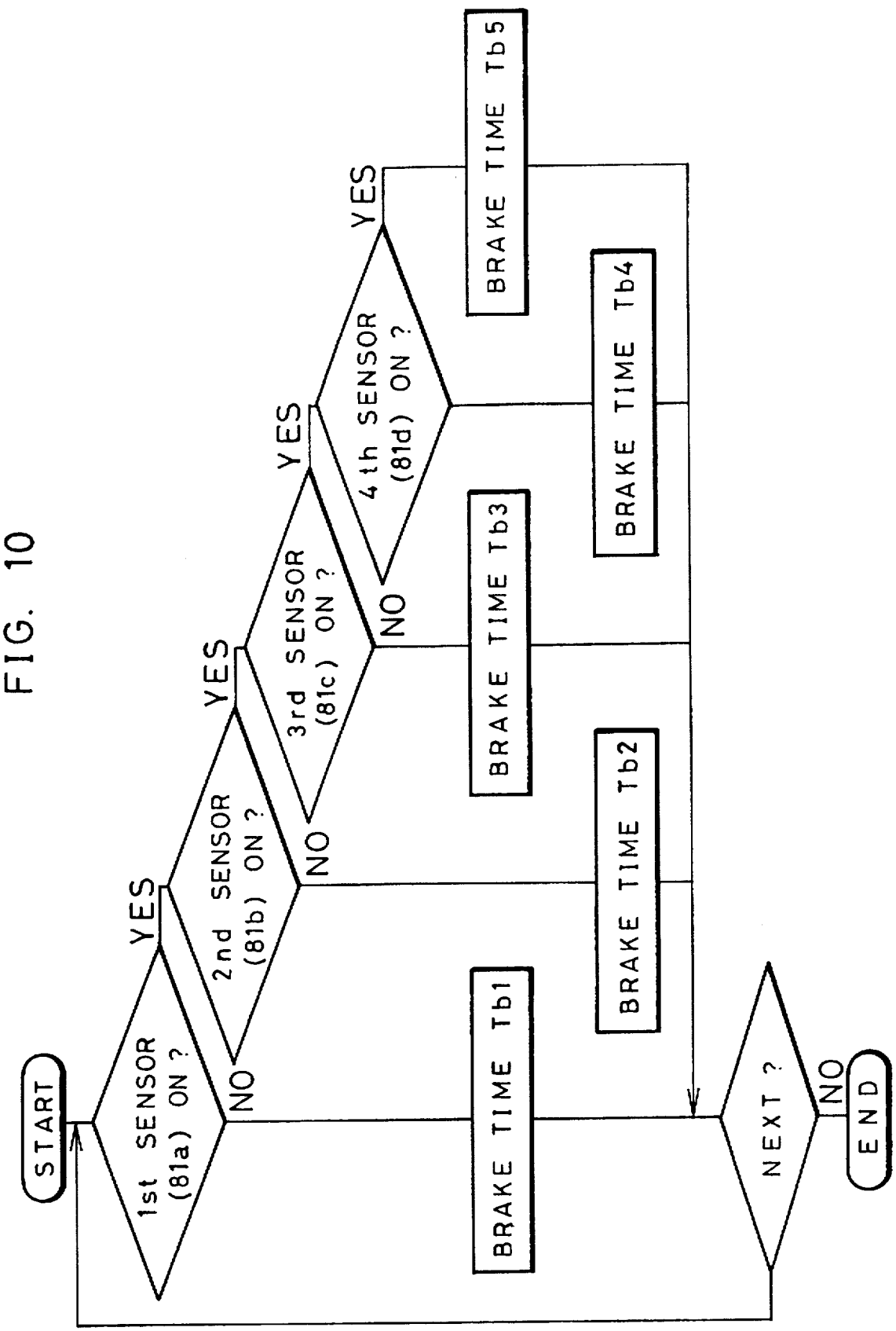
FIG. 10 is a flow chart illustrating a sequence of controlling brake time in accordance with the paper roll diameter, according to another preferred embodiment.

Instead of selectively using one of the different resistances Ra to Re, it is possible to use a single resistance for braking while changing brake time in accordance with the paper roll diameter, in order to reduce variation in amount of paper wound in the delay time from the inactivation to the actual stop of the DC winding motor, that is resulted from inertia. FIG. 10 shows a control sequence of such an embodiment, wherein five brake times Tb to Tb5 (Tb1<Tb2<Tb3<Tb4<Tb5) are predetermined in association with the five diameter grades of the paper roll 18 which are determined with reference to the four sensors 81a to 81d. It is also possible for more fine control of braking force to combine the brake time adjustment with the resistance adjustment.

Although the above described embodiments use the four sensors 81a to 81d for determining the paper roll diameter in five grades, it is instead possible to connect the switching transistor 88 to a rheostat 100 for dynamic braking of the DC winding motor 59, as is shown in FIG. 11. The rheostat 100 is controlled in accordance with the rotational angle of the shafts 79a and 79b of the upper paper guide arms 54a and 54b, such that the resistance of the rheostat 100 decreases with the increase of the paper roll diameter. According to this embodiment, braking force may be controlled in more precision. In FIG. 11, the same or like elements are designated by the same reference numbers as the embodiment shown in FIG. 5, and the description of these elements are omitted. The rheostat 100 may be connected to the lower guide arms 53a and 53b or other members such as sliders which cooperates with the paper roll diameter. In case where sliders are used, a slidable rheostat is preferable.

It is also possible to divide the paper roll diameter changing range into more than or less than five grades. The increments should not always be equal for each grade. It is preferable to set the increments the larger in the smaller grade of the paper roll diameter. Furthermore, the angle detection plates 80a and 80b may be connected to specific detection arms other than the paper guide arms 54a and 54b or 53a and 53b. It is also possible to directly measure the paper roll diameter by using reflective optical sensors.

Although the resistances Ra to Re are connected in parallel, one of which is selectively connected to the DC winding motor 59, it is possible to connect a plurality of resistances in series and change the resistance value by combining some of these resistances through selectors.

It is not always necessary to provide the first and second paper take-up spindles. It is possible to use a single paper take-up spindle in the printer. The first and second paper take-up spindles may be driven by respective drive motors. Of course, the present invention is applicable to wind up any kind of paper besides color photographic paper.

While the present invention has been described with reference to the preferred embodiments shown in the drawings, the present invention is not to be limited to these embodiments. Thus, various changes and modifications of the present invention are possible without departing from the scope of the invention as defined by the following claims.

What is claimed is:

1. A paper winding device for winding up photographic paper after exposure on a take-up spool in a photographic printer by rotating said take-up spool, said paper winding device comprising:

a DC motor for rotating said take-up spool, wherein said DC motor applies a braking force to the take-up spool when said DC motor is deactivated;

a detection device for detecting a diameter of a paper roll wound on said take-up spool;

a plurality of resistors having different resistances, means for connecting one of said resistors in parallel with said DC motor when said DC motor is deactivated; and means for selecting one of said plurality of resistors to be connected in parallel with said DC motor in accordance with the paper roll diameter in order to increase the braking force on said take-up spool as the paper roll diameter increases, thereby to reduce variation in paper winding amount within a time from deactivation of said DC motor to a time of actual stopping of said take-up spool.

2. A paper winding device as claimed in claim 1, further comprising a loop forming portion disposed upstream of said take-up spool, and a loop sensor for detecting a size of a loop of said photographic paper stored in said loop forming portion, wherein said DC motor is activated or deactivated depending on the size of said loop.

3. A paper winding device as claimed in claim 1, wherein said detection device comprises a pivotal arm whose distal end is urged to contact the outermost convolution of said paper roll, and an angle detector means for detecting declination of said pivotal arm which is related to the paper roll diameter.

4. A paper winding device as claimed in claim 3, wherein said angle detector means comprises a plurality of sensors which are arranged to detect declination of said pivotal arm, thereby to determine the paper roll diameter in a plurality of steps.

5. A paper winding device as claimed in claim 3, wherein said pivotal arm is used as a guide means for guiding a leading end of said photographic paper toward said take-up spool until said leading end is wound around said take-up spool.

6. A paper winding device as claimed in claim 5, further comprising a roller means which is driven by a motor for leading said leading end of said photographic paper to said take-up spool along said pivotal arm until said leading end is wound around said take-up spool.

7. A paper winding device as recited in claim 1, wherein said selecting means selects a resistor having a low resistance when the paper roll diameter is large, and a resistor having a high resistance when the paper roll diameter is small.

* * * * *